(12) United States Patent
Pedersen et al.

(10) Patent No.: US 12,538,157 B2
(45) Date of Patent: Jan. 27, 2026

(54) UE MEASUREMENT RESTRICTIONS TO PROTECT CRITICAL DATA RECEPTIONS

(71) Applicant: Nokia Technologies Oy, Espoo (FI)

(72) Inventors: Klaus Ingemann Pedersen, Aalborg (DK); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 345 days.

(21) Appl. No.: 18/248,695

(22) PCT Filed: Oct. 5, 2021

(86) PCT No.: PCT/EP2021/077392
§ 371 (c)(1),
(2) Date: Apr. 12, 2023

(87) PCT Pub. No.: WO2022/084023
PCT Pub. Date: Apr. 28, 2022

(65) Prior Publication Data
US 2023/0397033 A1    Dec. 7, 2023

Related U.S. Application Data

(60) Provisional application No. 63/093,542, filed on Oct. 19, 2020.

(51) Int. Cl.
*H04W 24/10*   (2009.01)
*H04W 72/11*   (2023.01)
(Continued)

(52) U.S. Cl.
CPC ............ *H04W 24/10* (2013.01); *H04W 72/11* (2023.01); *H04W 72/12* (2013.01); *H04W 72/56* (2023.01)

(58) Field of Classification Search
CPC . H04W 72/563; H04W 72/51; H04W 72/569; H04W 8/24; H04B 7/0413; H04L 27/2665; H04L 1/1657; H04L 5/0023
See application file for complete search history.

(56) References Cited

U.S. PATENT DOCUMENTS

2018/0324678 A1\* 11/2018 Chen .................. H04W 8/08
2019/0319748 A1\* 10/2019 Nam .................. H04L 27/2665
(Continued)

FOREIGN PATENT DOCUMENTS

| WO | 2019/160331 A1 | 8/2019 |
|---|---|---|
| WO | 2019/215328 A1 | 11/2019 |
| WO | 2020/092732 A1 | 5/2020 |

OTHER PUBLICATIONS

Abreu et al., "Scheduling Enhancements and Performance Evaluation of Downlink 5G Time-Sensitive Communications", IEEE Access, vol. 8, Jul. 10, 2020, pp. 128106-128115.
(Continued)

*Primary Examiner* — Mahran Y Abu Roumi
(74) *Attorney, Agent, or Firm* — Lippes Mathias LLP (57) ABSTRACT

A system, apparatus, method, and non-transitory computer readable medium for protecting critical data receptions by a user equipment (UE) device may include a UE device which is caused to, receive data reception priority configuration information from the serving RAN node, the data reception priority configuration information including designating a scheduling information priority time window, and receive scheduling information from the serving RAN node using a first antenna panel of one or more antenna panels during the scheduling information priority time window based on the data reception priority configuration information and signal quality measurements corresponding to each antenna panel of the one or more antenna panels.

20 Claims, 6 Drawing Sheets

(51) Int. Cl.
*H04W 72/12* (2023.01)
*H04W 72/56* (2023.01)

(56) References Cited

U.S. PATENT DOCUMENTS

2020/0015246 A1 1/2020 Vilaipornsawai et al.
2020/0112978 A1 4/2020 Zhang et al.

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.0.0, Jun. 2019, pp. 1-54.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
"3rd Generation Partnership Project; Technical Specification Group Radio Access Network; NR; Requirements for support of radio resource management (Release 16)", 3GPP TS 38.133, V16.4.0, Jun. 2020, 1463 pages.
"3rd Generation Partnership Project; Technical Specification Group Radio Access Network; NR; Medium Access Control (MAC) protocol specification (Release 16)", 3GPP TS 38.321, V16.1.0, Jul. 2020, pp. 1-151.
"3rd Generation Partnership Project; Technical Specification Group Radio Access Network; NR; Physical layer procedures for control (Release 16)", 3GPP TS 38.213, V16.2.0, Jun. 2020, pp. 1-176.
"On Channels Multiplexing", 3GPP TSG RAN WG1 Meeting #93, R1-1807188, Agenda: 7.1.2.2.6, Nokia, May 21-25, 2018, pp. 1-5.
International Search Report and Written Opinion received for corresponding Patent Cooperation Treaty Application No. PCT/EP2021/077392, dated Feb. 8, 2022, 11 pages.
Office action received for corresponding European Patent Application No. 21786936.1, dated Mar. 14, 2024, 5 pages.
Oral Proceedings received for corresponding European Patent Application No. 21786936.1, dated Aug. 9, 2024, 7 pages.

* cited by examiner

UE MEASUREMENT RESTRICTIONS TO PROTECT CRITICAL DATA RECEPTIONS

RELATED APPLICATION

This application claims priority to PCT Application No. PCT/EP2021/077392, filed on Oct. 5, 2021, which claims priority to U.S. Provisional Application No. 63/093,542, filed on Oct. 19, 2020, each of which is incorporated herein by reference in its entirety.

BACKGROUND

Field

Various example embodiments relate to methods, apparatuses, systems, and/or non-transitory computer readable media for user equipment (UE) measurement restrictions to protect critical data receptions.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. One of the improvements offered by the 5G standard is Ultra Reliable Low Latency Communications (URLLC), which includes Quality of Service (QoS) and/or Quality of Experience (QoE) requirements of an average latency of 1.0 ms for user plane data transmissions (uplink and downlink), and a reliability factor of 1-10-5 when transmitting a 32 byte user plane packet within 1 ms. Additionally, another goal of the 5G standard is to provide time sensitive communications (TSC) and/or wireless time sensitive networking (TSN) to, for example, industrial Internet of Things (IoT) devices, etc., which guarantee data delivery within a guaranteed time window, e.g., a latency of 0.5 ms, packet delay variation (jitter) of 1 microsecond, and reliability requirements of 99.9999%.

Therefore, it is a desired goal of the 5G standard to ensure that user equipment (UE) devices receive desired, critical, and/or necessary data transmission from the wireless network, such as uplink (UL) and/or downlink (DL) scheduling information from the wireless network to the UE device in order to guarantee the QoS and/or QoE requirements of URLLC and/or TSC, etc. However, the current 5G standard does not require UE devices to prioritize the reception of desired, critical, and/or necessary data transmissions from the wireless network and therefore the UE device may fail to receive these transmissions. For example, during the transmission period of UL and/or DL scheduling information from a radio access network (RAN) node to the UE device, UE devices operating on certain frequency ranges dedicated to the 5G standard, such as frequency range (FR) 2 which corresponds to 24.25 GHz to 52.6 GHz frequency bands, are required to UE device may perform previously configured signal quality measurements using one or more of its antenna panel(s), and therefore the UE device may fail to receive the UL and/or DL scheduling information, causing the UE device to violate QoS and/or QoE requirements of URLLC, TSC, etc. Additionally, while UE devices operating in the FR1 frequency range, which corresponds to sub-6 GHz frequency bands, suffer from fewer requirements under the 5G standard, similar issues may arise as well because the 5G standard does not explicitly require the UE device to prioritize the reception of the UL and/or DL scheduling information during time periods where the UL and/or DL scheduling information transmissions conflict with previously scheduled signal quality measurement time periods. As another example, the UE device may include a plurality of antenna panels, which due to the physical orientation of the UE device and/or due to physical obstructions (e.g., placement of a user's hand on the UE device, etc.), causes the UE device to attempt to receive the UL and/or DL scheduling information on an antenna panel that does not have the best and/or highest signal quality with the serving RAN node.

Accordingly, an approach is desired that provides a method for prioritizing the reception of desired, critical, and/or necessary data from the wireless network, using the UE device's best antenna panel.

SUMMARY

At least one example embodiment relates to a user equipment (UE) device.

In at least one example embodiment, the UE device may include one or more antenna panels each configurable to communicate with at least one radio access network (RAN) node, the at least one RAN node including a serving RAN node, a memory storing computer readable instructions, and at least one processor configured to execute the computer readable instructions to cause the UE device to receive data reception priority configuration information from the serving RAN node, the data reception priority configuration information including designating a scheduling information priority time window, and receive scheduling information from the serving RAN node using a first antenna panel of the one or more antenna panels during the scheduling information priority time window based on the received data reception priority configuration information and signal quality measurements corresponding to each antenna panel of the one or more antenna panels.

Some example embodiments of the UE device provide that the UE device is further caused to receive signal quality measurement configuration information from the serving RAN node, the signal quality measurement configuration information designating a signal quality measurement time window, determine whether the scheduling information priority time window conflicts with the signal quality measurement time window, prioritize the receiving the scheduling information from the serving RAN node using the first antenna panel during the scheduling information priority time window in response to the scheduling information priority time window conflicting with the signal quality measurement time window, and collect second signal quality measurements corresponding to each antenna panel of the one or more antenna panels during the signal quality measurement time window in response to the scheduling information priority time window not conflicting with the signal quality measurement time window.

Some example embodiments of the UE device provide that the data reception priority configuration information is received from the serving RAN node as a radio resource control (RRC) message, the data reception priority configuration information including semi-persistent scheduling configuration information.

Some example embodiments of the UE device provide that the data reception priority configuration information is received from the serving RAN node as a physical-layer signaling message, the data reception priority configuration information including on-demand scheduling configuration information.

Some example embodiments of the UE device provide that the data reception priority configuration information is received from the serving RAN node as a medium access control (MAC) control element (CE) signaling message, the data reception priority configuration information including on-demand scheduling configuration information.

Some example embodiments of the UE device provide that the UE device is further caused to collect the signal quality measurements corresponding to each antenna panel of the one or more antenna panels prior to receiving the scheduling information from the serving RAN node, and select an antenna panel having a best signal quality measurement of the one or more antenna panels as the first antenna panel.

Some example embodiments of the UE device provide that the UE device is further caused to collect the signal quality measurements of each antenna panel of the one or more antenna panels by determining, for each antenna panel of the one or more antenna panels, at least one of reference signal received power measurement, received signal strength indicator measurement, reference signal received quality measurement, signal-to-noise and interference ratio measurement, or any combinations thereof.

Some example embodiments of the UE device provide that the received scheduling information includes at least one of physical downlink control channel (PDCCH) information, physical downlink shared channel (PDSCH) information, physical uplink control channel (PUCCH) information, physical uplink shared channel information (PUSCH), or any combinations thereof.

At least one example embodiment relates to a radio access network (RAN) node.

In at least one example embodiment, the RAN node may include a memory storing computer readable instructions, and at least one processor configured to execute the computer readable instructions to cause the RAN node to transmit data reception priority configuration information to at least one user equipment (UE) device, the data reception priority configuration information including designating a scheduling information priority time window, and transmit scheduling information to the at least one UE device, the data reception priority configuration information causing the at least one UE device to receive the scheduling information using a first antenna panel of one or more antenna panels during the scheduling information priority time window based on the data reception priority configuration information and signal quality measurements corresponding to each antenna panel of the one or more antenna panels.

Some example embodiments of the RAN node provide that the RAN node is further caused to transmit signal quality measurement configuration information to at least one user equipment (UE) device, the signal quality measurement configuration information designating a signal quality measurement time window.

Some example embodiments of the RAN node provide that the RAN node is further caused to transmit the data reception priority configuration information as a radio resource control (RRC) message, the data reception priority configuration information including semi-persistent scheduling configuration information.

Some example embodiments of the RAN node provide that the RAN node is further caused to transmit the data reception priority configuration information as a physical-layer signaling message, the data reception priority configuration information including on-demand scheduling configuration information.

Some example embodiments of the RAN node provide that the RAN node is further caused to transmit the data reception priority configuration information as a medium access control (MAC) control element (CE) signaling message, the data reception priority configuration information including on-demand scheduling configuration information.

Some example embodiments of the RAN node provide that the that scheduling information includes at least one of physical downlink control channel (PDCCH) information, physical downlink shared channel (PDSCH) information, physical uplink control channel (PUCCH) information, physical uplink shared channel information (PUSCH), or any combinations thereof.

At least one example embodiment relates to a method of operating a user equipment (UE) device, the UE device including at least one processor for performing the method.

In at least one example embodiment, the method may include receiving data reception priority configuration information from a serving RAN node, the data reception priority configuration information including designating a scheduling information priority time window, and receiving scheduling information from the serving RAN node using a first antenna panel of one or more antenna panels of the UE device during the scheduling information priority time window based on the received data reception priority configuration information and signal quality measurements corresponding to each antenna panel of the one or more antenna panels.

Some example embodiments of the method may further include receiving signal quality measurement configuration information from the serving radio access network (RAN) node, the signal quality measurement configuration information designating a signal quality measurement time window, determining whether the scheduling information priority time window conflicts with the signal quality measurement time window, prioritizing the receiving the scheduling information from the serving RAN node using the first antenna panel during the scheduling information priority time window in response to the scheduling information priority time window conflicting with the signal quality measurement time window, and collecting second signal quality measurements corresponding to each antenna panel of the one or more antenna panels during the signal quality measurement time window in response to the scheduling information priority time window not conflicting with the signal quality measurement time window.

Some example embodiments of the method provide that the data reception priority configuration information is received from the serving RAN node as a radio resource control (RRC) message, the data reception priority configuration information including semi-persistent scheduling configuration information.

Some example embodiments of the method provide that the data reception priority configuration information is received from the serving RAN node as a physical-layer signaling message, the data reception priority configuration information including on-demand scheduling configuration information.

Some example embodiments of the method provide that the data reception priority configuration information is received from the serving RAN node as a medium access control (MAC) control element (CE) signaling message, the data reception priority configuration information including on-demand scheduling configuration information.

Some example embodiments of the method may further include collecting the signal quality measurements of each antenna panel of the one or more antenna panels, the collecting the signal quality measurements including determining, for each antenna panel of the one or more antenna panels, at least one of reference signal received power measurement, received signal strength indicator measurement, reference signal received quality measurement, signal-to-noise and interference ratio measurement, or any combinations thereof.

Some example embodiments of the method provide that the received scheduling information includes at least one of physical downlink control channel (PDCCH) information, physical downlink shared channel (PDSCH) information, physical uplink control channel (PUCCH) information, physical uplink shared channel information (PUSCH), or any combinations thereof.

At least one example embodiment relates to a user equipment (UE) device.

In at least one example embodiment, the UE device may include means for receiving data reception priority configuration information from the serving RAN node, the data reception priority configuration information including designating a scheduling information priority time window, and receiving scheduling information from the serving RAN node using a first antenna panel of one or more antenna panels during the scheduling information priority time window based on the received data reception priority configuration information and signal quality measurements corresponding to each antenna panel of the one or more antenna panels.

Some example embodiments of the UE device includes means for receiving signal quality measurement configuration information from the serving RAN node, the signal quality measurement configuration information designating a signal quality measurement time window, determining whether the scheduling information priority time window conflicts with the signal quality measurement time window, prioritizing the receiving the scheduling information from the serving RAN node using the first antenna panel during the scheduling information priority time window in response to the scheduling information priority time window conflicting with the signal quality measurement time window, and collecting second signal quality measurements corresponding to each antenna panel of the one or more antenna panels during the signal quality measurement time window in response to the scheduling information priority time window not conflicting with the signal quality measurement time window.

Some example embodiments of the UE device provide that the data reception priority configuration information is received from the serving RAN node as a radio resource control (RRC) message, the data reception priority configuration information including semi-persistent scheduling configuration information.

Some example embodiments of the UE device provide that the data reception priority configuration information is received from the serving RAN node as a physical-layer signaling message, the data reception priority configuration information including on-demand scheduling configuration information.

Some example embodiments of the UE device provide that the data reception priority configuration information is received from the serving RAN node as a medium access control (MAC) control element (CE) signaling message, the data reception priority configuration information including on-demand scheduling configuration information.

Some example embodiments of the UE device includes means for collecting the signal quality measurements corresponding to each antenna panel of the one or more antenna panels prior to receiving the scheduling information from the serving RAN node, and selecting an antenna panel having a best signal quality measurement of the one or more antenna panels as the first antenna panel.

Some example embodiments of the UE device includes means for collecting the signal quality measurements of each antenna panel of the one or more antenna panels by determining, for each antenna panel of the one or more antenna panels, at least one of reference signal received power measurement, received signal strength indicator measurement, reference signal received quality measurement, signal-to-noise and interference ratio measurement, or any combinations thereof.

Some example embodiments of the UE device provide that the received scheduling information includes at least one of physical downlink control channel (PDCCH) information, physical downlink shared channel (PDSCH) information, physical uplink control channel (PUCCH) information, physical uplink shared channel information (PUSCH), or any combinations thereof.

At least one example embodiment relates to a radio access network (RAN) node.

In at least one example embodiment, the RAN node may include means for transmitting data reception priority configuration information to the at least one UE device, the data reception priority configuration information including designating a scheduling information priority time window, and transmitting scheduling information to the at least one UE device, the data reception priority configuration information causes the at least one UE device to receive the scheduling information using a first antenna panel of one or more antenna panels during the scheduling information priority time window based on the data reception priority configuration information and signal quality measurements corresponding to each antenna panel of the one or more antenna panels.

Some example embodiments of the RAN node provide that the RAN node further includes means for transmitting signal quality measurement configuration information to at least one user equipment (UE) device, the signal quality measurement configuration information designating a signal quality measurement time window.

Some example embodiments of the RAN node may include means for transmitting the data reception priority configuration information as a radio resource control (RRC) message, the data reception priority configuration information including semi-persistent scheduling configuration information.

Some example embodiments of the RAN node includes means for transmitting the data reception priority configuration information as a physical-layer signaling message, the data reception priority configuration information including on-demand scheduling configuration information.

Some example embodiments of the RAN node includes means for transmitting the data reception priority configuration information as a medium access control (MAC) control element (CE) signaling message, the data reception priority configuration information including on-demand scheduling configuration information.

Some example embodiments of the RAN node provide that the transmitted scheduling information includes at least one of physical downlink control channel (PDCCH) information, physical downlink shared channel (PDSCH) information, physical uplink control channel (PUCCH) information, physical uplink shared channel information (PUSCH), or any combinations thereof.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Figure 1:
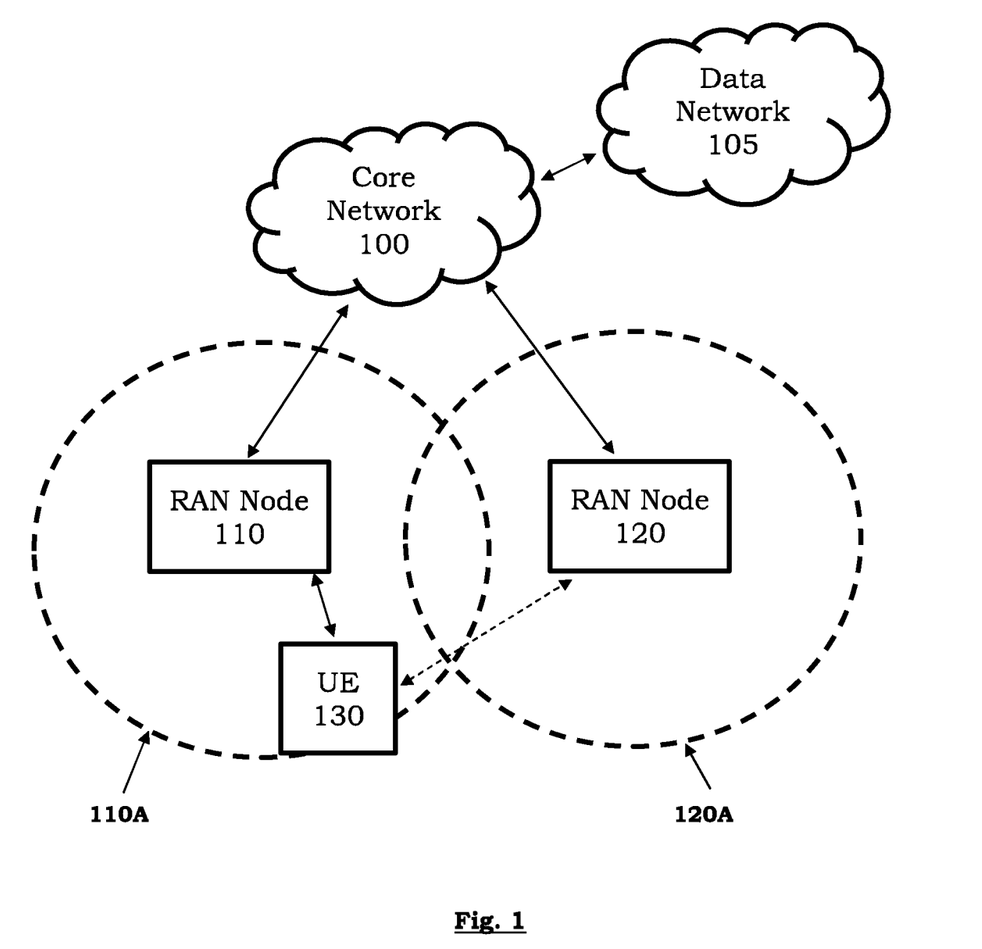
FIG. 1 illustrates a wireless communication system according to at least one example embodiment.

FIG. 1 illustrates a wireless communication system according to at least one example embodiment. As shown in FIG. 1, a wireless communication system includes a core network 100, and a Data Network 105, a first radio access network (RAN) node 110, a second RAN node 120, and user equipment (UE) device 130, but the example embodiments are not limited thereto and the example embodiments may include a greater or lesser number of constituent elements. For example, the wireless communication system may include two or more UE devices, a single RAN node, three or more RAN nodes, etc.

The RAN nodes 110 and 120 and/or the UE device 130 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network 105. The RAN nodes 110 and 120 may connect to each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

The UE device 130 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s). The UE device 130 may be configurable to transmit and/or receive data in accordance to strict latency, reliability, and/or accuracy requirements, such as URLLC communications, TSC communications, etc., but the example embodiments are not limited thereto.

The wireless communication system further includes at least one RAN node (e.g., a base station, a wireless access point, etc.), such as RAN nodes 110 and 120, etc. The RAN nodes 110 and 120 may operate according to an underlying cellular and/or wireless radio access technology (RAT), such as 5G NR, LTE, Wi-Fi, etc. For example, the RAN nodes 110 and/or 120 may be a 5G gNB node, a LTE eNB node, or a LTE ng-eNB node, etc., but the example embodiments are not limited thereto. The RAN nodes 110 and 120 may each provide wireless network services to one or more UE devices within a cell service area (e.g., a broadcast area, a serving area, a coverage area, etc.) surrounding the respective physical location of the RAN node, such as a cell service area 110A surrounding the RAN node 110, and a cell service area 120A surrounding the RAN node 120, etc. For example, UE device 130 is located within the cell service area 110A, and may connect to, receive broadcast messages from, receive paging messages from, receive/transmit signaling messages from/to, and/or access the wireless network through, etc., RAN node 110 (e.g., the RAN node serving the UE device 130), but the example embodiments are not limited thereto. There may also be overlap between two or more cell service areas, such as the overlap region between regions 110A and 120A of FIG. 1, and UE devices located within the overlap region, may connect to either RAN node 110 and RAN node 120, may access RAN node 110 and RAN node 120 simultaneously, etc. Moreover, one or more UE devices may travel from one cell servicing area to another cell servicing area as well.

Additionally, the UE device 130 may perform signal quality measurements based on, or in respect to, the serving RAN node (e.g., RAN node 110) and/or neighboring RAN node(s) (e.g., RAN node 120). For example, the UE device 130 may measure (e.g., collect, determine, etc.) signal quality information between one or more of the antenna panels of the UE device 130 and the serving RAN node and/or the neighboring RAN node(s), etc. Examples of the signal quality information may include reference signal received power (RSRP) measurements, received signal strength indicator (RSSI) measurements, reference signal received quality (RSRQ) measurements, signal-to-noise and interference ratio (SINR) measurements, etc., but the example embodiments are not limited thereto.

The RAN nodes 110 and/or 120 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system 100, such as access points, switches, routers, nodes, servers, gateways, etc.

Figure 2:
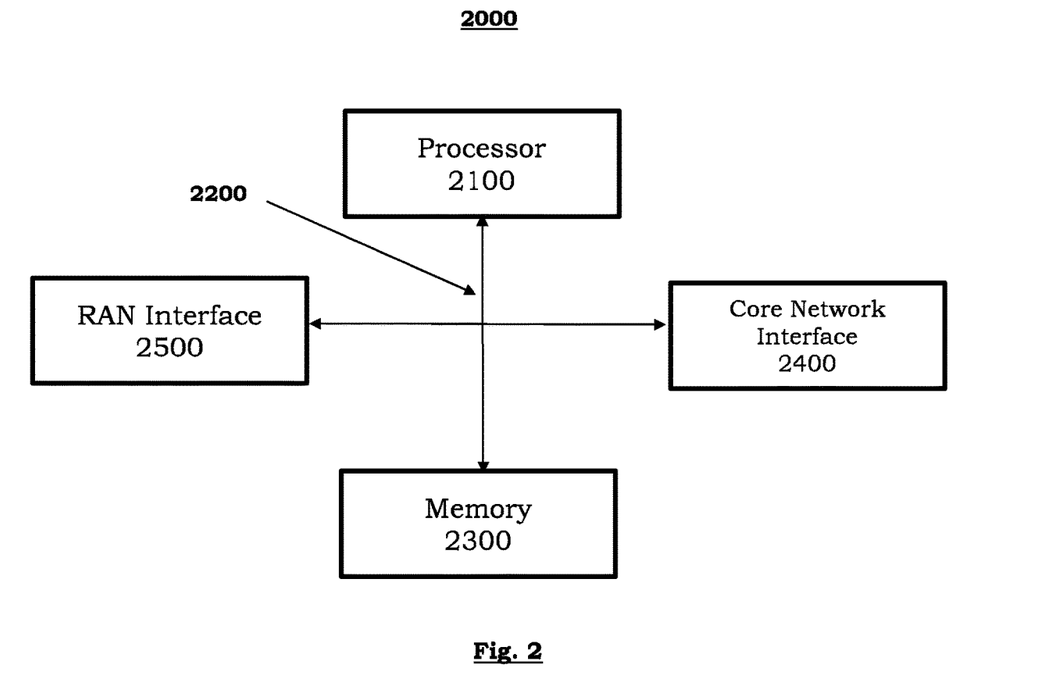
FIG. 2 illustrates a block diagram of an example RAN node according to at least one example embodiment.

FIG. 2 illustrates a block diagram of an example RAN node according to at least one example embodiment. The RAN node may be the first RAN node 110 and/or the second RAN node 120 of FIG. 1, but is not limited thereto.

Referring to FIG. 2, a RAN node 2000 may include processing circuitry, such as at least one processor 2100, at least one communication bus 2200, a memory 2300, at least one core network interface 2400, and/or at least one radio access network (RAN) network interface 2500, but the example embodiments are not limited thereto. For example, the core network interface 2400 and the RAN network interface 2500 may be combined into a single network interface, etc., or the RAN node 2000 may include a plurality of RAN interfaces, a plurality of core network interfaces, etc., and/or combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 6B, the at least one core network interface 2400, and/or at least one RAN network interface 2500, etc. Such software elements may be loaded from a non-transitory computer-readable storage medium independent of the memory 2300, using a drive mechanism (not shown) connected to the RAN node 2000, or via the at least one core network interface 2400, and/or at least one RAN network interface 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule resource blocks for UE devices connected to the RAN node 2000.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 may allocate time domain resources (e.g., time slots and orthogonal frequency division multiplexing (OFDM) symbols) to one or more UEs (e.g., UE 130, etc.) connected to the RAN node 2000 during designated upload (e.g., uplink (UL)) time periods and designated download (e.g., downlink (DL)) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context, the RAN node 2000 may allocate separate frequency subbands of the carrier to UEs simultaneously served by the RAN node 2000, for uplink and/or downlink transmissions. However, the example embodiments are not limited thereto, and the RAN node 2000 may also schedule UE devices on overlapping time-frequency resources by scheduling different UE devices on different beams of the RAN node 2000 and/or using multi-user multiple-input multiple-output (MU-MIMO) scheduling techniques, etc. Data transmission between the UE and the RAN node 2000 may occur on slot resolution, a radio frame basis, and/or based on mini-slot resolution, etc. The minimum resource unit for allocation and/or assignment by the RAN node 2000 to a particular UE device corresponds to a specific downlink/uplink time slot (e.g., one OFDM symbol, one slot, one minislot, one subframe, etc.) and/or a specific downlink/uplink resource block (e.g., twelve adjacent subcarriers, a frequency subband, etc.).

For the sake of clarity and consistency, the example embodiments will be described as using the time domain, but the example embodiments are not limited thereto and the example embodiments may operate in the frequency domain.

Additionally, the RAN node 2000 may transmit scheduling information via physical downlink common channel information (PDCCH) to the one or more UE devices located within the cell servicing area of the RAN node 2000, which may configure the one or more UE devices to transmit (e.g., UL transmissions via physical uplink control channel (PUCCH) information and/or physical uplink shared channel information (PUSCH), etc.) and/or receive (e.g., DL transmissions via PDCCH and/or physical downlink shared channel information (PDSCH), etc.) data packets to and/or from the RAN node 2000. For example, with respect to the 5G standard's URLLC transmissions, the RAN node 2000 may perform "dynamic scheduling" of the DL and/or UL transmissions of the UE device by transmitting scheduling messages (e.g., dynamic scheduling messages, on demand scheduling messages, etc.) to the UE device using downlink control information (DCI) messages via physical (PHY) layer signaling and/or messaging. In other words, the RAN node 2000 may transmit a DCI message to the UE device scheduling one or more windows of DL and/or UL transmissions for the UE device but the example embodiments are not limited thereto. Additionally, the RAN node 200 may perform dynamic scheduling of the DL and/or UL transmissions of the UE device by transmitting scheduling messages (e.g., dynamic scheduling messages, on demand scheduling messages, etc.) to the UE device via medium access control (MAC) layer control element (CE) signaling and/or messaging, but the example embodiments are not limited thereto. As another example of 5G URLLC transmission, the RAN node 2000 may perform static or semi-static scheduling of the DL and/or UL transmission of the UE device by transmitting semi-persistent scheduling (SPS) configuration information for DL scheduling, and/or configured scheduling (CS) configuration information for UL scheduling, to the UE device via radio resource control (RRC) signaling and/or messaging, but the example embodiments are not limited thereto. The SPS configuration information informs the UE device of the schedule (e.g., time periods and/or frequencies) for receiving PDCCH and/or PDSCH transmissions from the serving RAN node, e.g., RAN node 2000, and the CS configuration information informs the UE device of the schedule (e.g., time periods and/or frequencies) for transmitting PUCCH and/or PUSCH transmissions to the serving RAN node, e.g., RAN node 2000, etc., but the example embodiments are not limited thereto. The scheduling information transmission and SPS configuration information, etc., will be discussed in further detail in connection with FIGS. 4 to 6B.

The RAN node 2000 may also include at least one core network interface 2400, and/or at least one RAN network interface 2500, etc. The at least one RAN network interface 2500 may include an associated radio unit (not shown) and may be used to transmit the wireless signals in accordance with a radio access technology, such as 4G LTE wireless signals, 5G NR wireless signals, etc., to at least one RAN node, such as RAN node 110, and/or to at least one UE device, such as UE 130, etc. According to some example embodiments, the RAN network interface 2500 may be a single antenna, or may be a plurality of antennas, etc.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (e.g., Data Network 105), such as the Internet, intranets, wide area networks, telephone networks, VoIP networks, etc.

Figure 3:
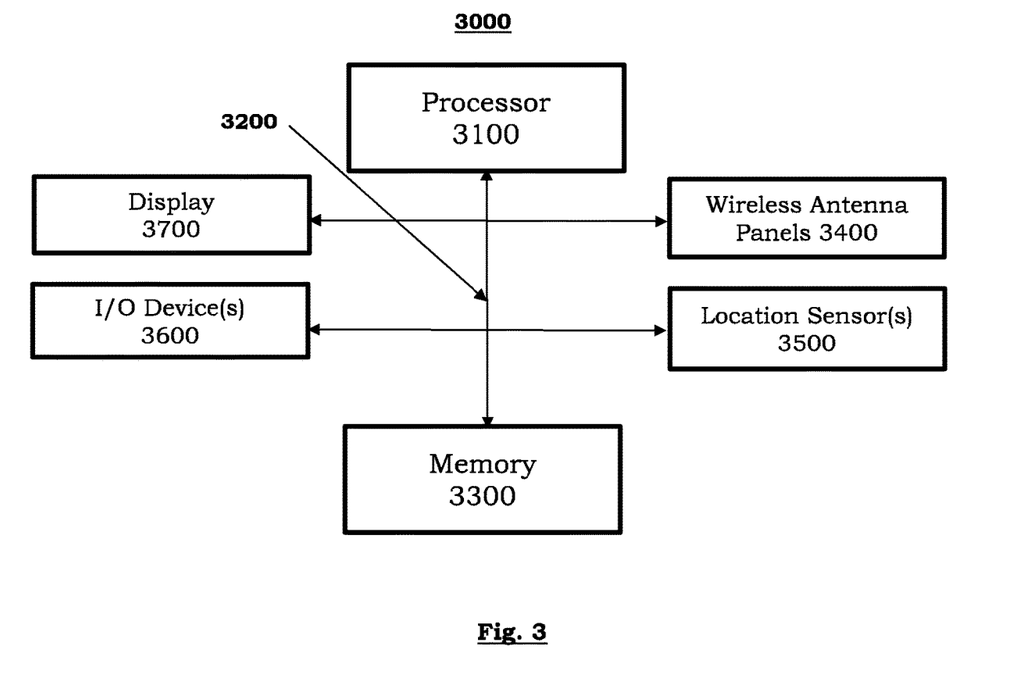
FIG. 3 illustrates a block diagram of a UE device according to at least one example embodiment.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), a remote radio head (RRH), and/or a remote radio unit (RRU), etc., but the example embodiments are not limited thereto. Additionally, the RAN node 2000 may operate in standalone (SA) mode and/or non-standalone (NSA) mode using interfaces (not shown) such as X2, Xn, etc., between the RAN node 2000 and other RAN nodes of the wireless network, interfaces, such as Si, NG, etc., between the RAN node 2000 and the core network (e.g., core network 100), interfaces between network functions of the RAN node 2000 operating in a distributed and/or virtual RAN mode (not shown), such as F1, E1, etc., and/or interfaces between the physical layer (e.g., a baseband unit, etc.) and the radio layer (e.g., a RRH, RAN interface 2500, etc.) (not shown), such as CPRI, eCPRI, etc., but the example embodiments are not limited thereto FIG. 3 illustrates a block diagram of an example UE device according to at least one example embodiment. The example UE device of FIG. 3 may correspond to the UE device 130 of FIG. 1, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include a battery, one or more additional sensors (e.g., thermometers, humidity sensors, pressure sensors, motion sensors, accelerometers, etc.), actuators, a single wireless antenna and/or a single wireless antenna panel, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 to 6B, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, etc., for communicating with at least on RAN node, e.g., RAN nodes 110 and/or 120, etc., accessing a wireless network, etc., but the example embodiments are not limited thereto.

For example, according to at least one example embodiment, the UE 3000 may collect (e.g., measure, determine, etc.) signal quality information with regards to the signal(s) transmitted by a serving RAN node, e.g., RAN node 110, and/or at least one neighboring RAN node, e.g., RAN node 120, etc. The UE 3000 may collect and/or measure the signal quality information at each antenna panel of the plurality of antenna panels 3400 included in the UE 3000 by measuring at least one of the reference signal received power (RSRP) measurements, received signal strength indicator (RSSI) measurements, reference signal received quality (RSRQ) measurements, signal-to-noise and interference ratio (SINR) measurements, etc., but the example embodiments are not limited thereto. Additionally, according to some example embodiments, the UE 3000 may perform the signal quality information measurements during a desired time period and/or during desired time intervals, etc. For example, the UE 3000 may receive data reception priority configuration information (e.g., antenna panel configuration information, etc.) from the serving RAN node instructing the UE 3000 to perform the signal quality measurements according to a desired schedule (e.g., a desired signal quality measurement configuration, etc.), such as a synchronization signal block (SSB) based radio resources management (RRM) measurement timing configuration (SMTC) pattern, enhanced SPS configuration information, on-demand signaling (e.g., PHY signaling, MAC signaling, etc.), etc., but the example embodiments are not limited thereto. The signal quality measurement method will be discussed in further detail in connection with FIGS. 4 to 6B.

In at least one example embodiment, the at least one communication bus 3200 may enable communication and data transmission to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include a plurality of wireless antenna panels 3400 (e.g., a plurality of wireless antennas, etc.). The plurality of wireless antenna panels 3400 may include a plurality of associated radio units (not shown) and may be used to transmit wireless signals in accordance with at least one desired radio access technology, such as 4G LTE, 5G NR, Wi-Fi, etc. The plurality of wireless antenna panels 3400 may be located at the same or different physical locations on the body of the UE 3000, may have the same or different orientations, may operate in the same or different frequency ranges, may operate in accordance with the same or different radio access technology, etc. According to some example embodiments, the plurality of wireless antenna panels 3400 may be a single antenna, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000.

While FIG. 3 depicts an example embodiment of a UE 3000, the UE device is not limited thereto, and may include additional and/or alternative architectures that may be suitable for the purposes demonstrated.

Figure 4:
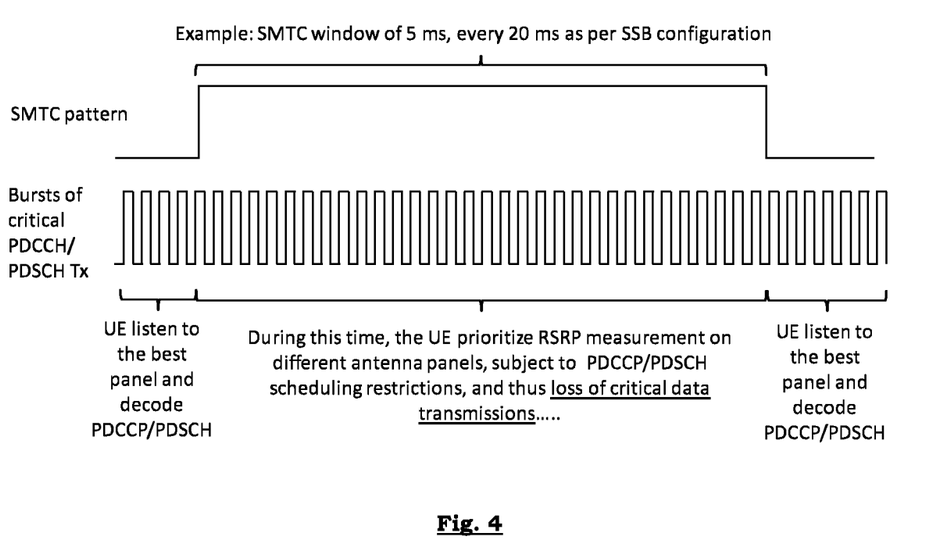
FIG. 4 illustrates conventional transmissions between a serving RAN node and at least one UE device.

FIG. 4 illustrates conventional transmissions between a serving RAN node and at least one UE device.

According to the conventional 5G standard, a UE device (e.g., UE device 130) may receive a SMTC pattern from the UE device's serving cell (e.g., RAN node 110). The SMTC pattern instructs and/or configures the UE device where it may perform signal quality measurement (e.g., RSRP measurement, etc.) using transmitted SSB blocks e.g., by the serving cell (and/or neighboring cells) during a desired SSB signal measurement window (e.g., SMTC window, etc.) for one or more of the UE device's antenna panels (e.g., wireless antennas) during the time period specified in the SMTC pattern. For example, the SMTC pattern may instruct and/or configure the UE device to perform signal quality measurements by one or more of the antenna panels e.g. for each of the UE device's antenna panels using SSBs received during the SMTC window. For example, if the SMTC window is 5 ms and is transmitted with a periodicity of 20 ms, the UE could perform measurements during a 5 ms window every 20 ms SSB transmission periodicity, but the example embodiments are not limited thereto. Moreover, during the signal quality measurement window, the UE device may measures the signal quality at one or more antenna panels individually (e.g., one at a time, etc.) and therefore the UE device would not be able to receive (and/or cannot receive) data on any of the antenna panels which are not being used for measured (e.g., any antenna panels that are not active, etc.). Additionally, during the signal quality measurement window, the UE device may measures the signal quality at one or more antenna panels individually (e.g., one at a time, etc.) and therefore the UE device would not be able to receive (and/or cannot receive) data on (any of) the antenna panels which are being used for measured (e.g., even if the antenna panels that are active, etc.). Further, the UE device may determine its highest quality and/or best antenna panel based on the collected signal quality measurements, and the UE device may use the highest quality and/or best antenna panel for subsequent UL/DL communication with the serving cell and/or the UE device may determine that another panel and/or a neighboring cell offers a better quality wireless connection, etc.

However, as shown in FIG. 4, the serving cell may transmit desired (e.g., important, critical, and/or necessary, etc.) UL/DL scheduling information (e.g., the PDCCH/PDSCH transmissions shown in FIG. 4, but not limited thereto) to the UE device during the signal quality measurement window. However, according to the current 5G standard, the UE device is assumed to prioritize the performance of the signal quality measurements during the desired signal quality measurement window when measurements are in need to be performed. This means, that when e.g. operating in FR2 (e.g., is restricted from performing other operations, such as receiving scheduling information from the serving RAN node, during the SMTC window using the UE device's antennas, etc.). Additionally, if the UE device is operating in FR1, under the current 5G standard, the UE device may also prioritize the reception of the scheduling information from the serving RAN node lower than performing measurements. Thus, the UE device may fail to receive the UL/DL scheduling information due to the prioritization of performing signal quality measurements. The lack of prioritization of the reception of the scheduling information, may cause delays and/or errors in the UL and/or DL transmission of the UE device, and the UE device may consequently violate QoS and/or QoE requirements (e.g., URLLC requirements and/or TSC requirements, etc.).

Figure 5A:
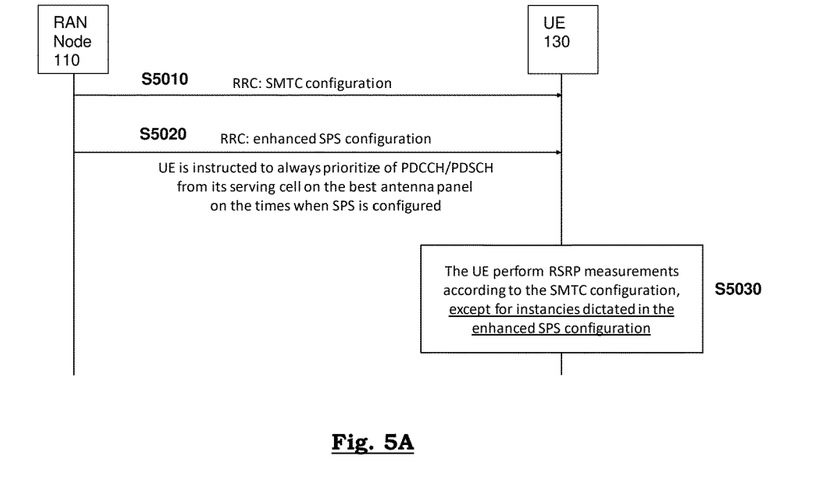
FIGS. 5A to 5B illustrate a first example transmission flow diagram between a RAN node and a UE device and corresponding example transmissions between a serving RAN node and at least one UE device according to at least one example embodiment.
Figure 5B:
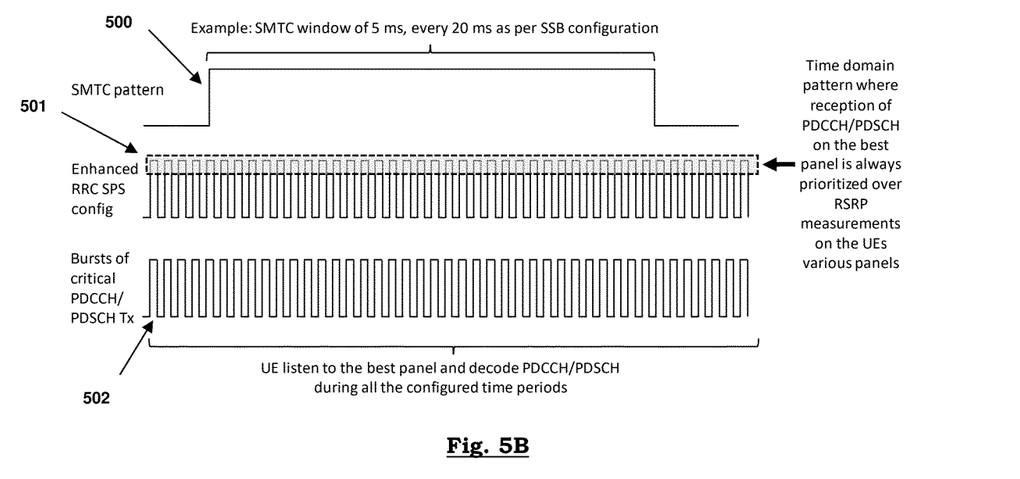

Referring now to FIGS. 5A and 5B, a first example transmission flow diagram and corresponding transmissions between a serving RAN node and at least one UE device are depicted according to at least one example embodiment. In operation 55010 of FIG. 5A, a serving RAN node (e.g., RAN node 110) transmits a signal quality measurement configuration message to a UE device (e.g., UE device 130). The signal quality measurement configuration message may include signal quality measurement configuration information specifying one or more signal quality measurement time windows (e.g., future signal quality measurement time windows, etc.) and/or periodicity of the signal quality measurement time windows, etc. For example, the signal quality measurement configuration information may be standard SMTC configuration information that is transmitted to the UE device 130 via RRC, but the example embodiments are not limited thereto. In operation 55020, the serving RAN node 110 transmits a data reception priority configuration message possibly including static and/or semi-static data reception priority configuration information to the UE device 130 via RRC. For example, the data reception priority configuration information may be enhanced SPS configuration information and/or enhanced CS configuration information, the enhanced SPS configuration information and/or enhanced CS configuration information indicating and/or instructing the UE device 130 to prioritize and/or always prioritize reception and/or transmission of desired scheduling information, such as PDCCH information, PDSCH information, PUCCH information, and/or PUSCH information, etc., during at least one specified desired scheduling information time window over a desired time period. However, the example embodiments are not limited thereto, and the data reception priority configuration information may include information prioritizing other and/or additional types of desired, important, critical and/or necessary data.

More specifically, as shown in operation 55030, according to at least one example embodiment, the data reception priority configuration message, e.g., the enhanced SPS configuration information, causes the UE device 130 to determine whether there is a conflict (e.g., timing conflict, overlap, etc.) between at least one of the signal quality measurement time windows and at least one of the desired scheduling information time windows. In response to determining that there is a conflict between the two time windows, the UE device 130 will prioritize the reception and/or transmission of the desired scheduling information during the conflicting time period using the UE device 130's active panel, e.g. highest quality and/or best antenna panel, over the measurement of signal quality metrics. During periods when there is no conflict, the UE device 130 may perform signal quality measurements in accordance with the schedule of the SMTC configuration information, etc.

Referring now to FIG. 5B, in contrast to the conventional transmissions of FIG. 4, the UE device 130 will listen for and/or receive the PDCCH/PDSCH messages 502 during the time period 501 specified by the, e.g., enhanced SPS configuration information received via RRC, e.g. using the UE device 130's highest quality and/or best antenna panel, instead of performing RSRP measurement during the signal quality measurement time window 500 included in the SMTC pattern, as shown in FIG. 4, but the example embodiments are not limited thereto, and for example, the UE device 130 may transmit PUCCH/PUSCH messages during the time period 501 in accordance with received enhanced CS configuration information, etc. Accordingly, the reception/transmission of desired, critical, and/or necessary DL and/or UL scheduling information from the wireless network e.g., using the UE device's best antenna panel is prioritized over the performance of signal quality measurement, thereby improving the QoS and/or QoE performance of connection.

Figure 6A:
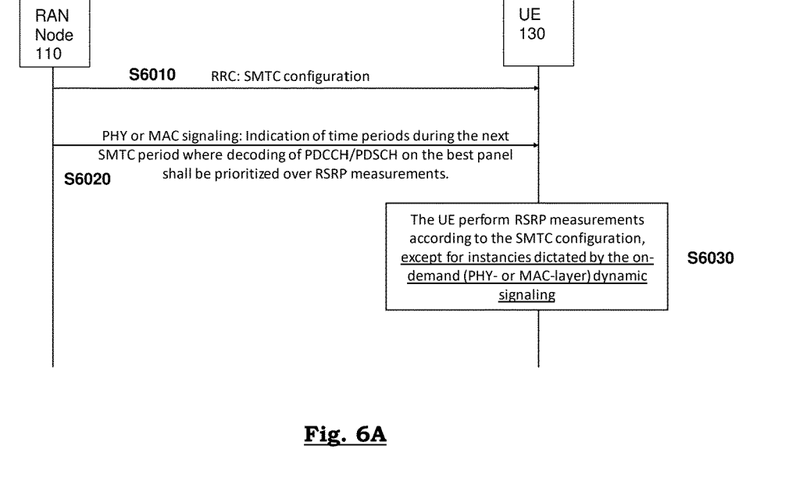
FIGS. 6A to 6B illustrate a second example transmission flow diagram between a RAN node and a UE device and corresponding example transmissions between a serving RAN node and at least one UE device according to at least one example embodiment.
Figure 6B:
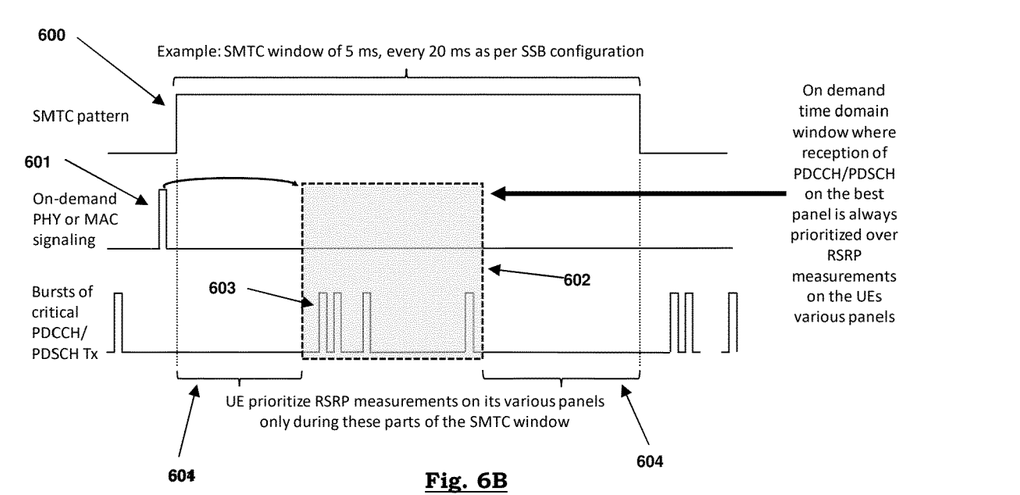

Referring now to FIGS. 6A and 6B, a second transmission flow diagram and corresponding transmissions between a serving RAN node and at least one UE device are depicted according to at least one example embodiment.

Similar to operation 55010 of FIG. 5A, in operation 56010 the serving RAN node (e.g., RAN node 110) transmits a signal quality measurement configuration message to the UE device 130. The signal quality measurement configuration message may include signal quality measurement configuration information specifying one or more signal quality measurement time windows and/or periodic signal quality measurement time windows, etc. For example, the signal quality measurement configuration information may be standard SMTC configuration information that is transmitted to the UE device 130 via RRC, but the example embodiments are not limited thereto.

In operation 56020, in contrast to operation 55020 of FIG. 5A, the serving RAN node 110 transmits a data reception priority configuration message including on-demand and/or dynamic data reception priority configuration information to the UE device 130 via PHY signaling or MAC CE signaling, etc. For example, the data reception priority configuration information may be a PHY signal and/or message and/or a MAC CE signal and/or message, indicating and/or instructing the UE device 130 to prioritize and/or always prioritize reception and/or transmission of desired scheduling information, such as PDCCH information, PDSCH information, PUCCH information, and/or PUSCH information, etc., during one or more future desired scheduling information time windows. According to at least one example embodiment, the serving RAN node 110 may estimate, predict, and/or determine when the next desired scheduling information message (e.g., the next PDCCH message, the next PDCSH message, etc.) will be transmitted to the UE device 130 and in accordance with the estimation, the RAN node 110 will transmit the on-demand data reception priority configuration information to the UE device 130, but the example embodiments are not limited thereto, and for example, the RAN node 110 may estimate a plurality of next desired scheduling information messages, etc. According to at least one example embodiment, the serving RAN node 110 may estimate the next desired scheduling information message based on known QoS and/or QoE requirements (e.g., 5G QoS Identifiers (5QI) information signaled from the core network to the serving RAN node indicating the QoS requirements for the connection, status information regarding URLLC messaging, TSC messaging, etc.), based on historical network traffic information, based on information received from the core network, etc., but the example embodiments are not limited thereto.

Referring now to FIG. 6B, and in contrast to the transmissions of FIG. 5B, the RAN node 110 may transmit an on-demand PHY or MAC CE signal 601 to the UE 130 including scheduling information priority time window 602 which is within the signal quality measurement time window 600 of the SMTC pattern. Further, the RAN node 110 may determine the length of the scheduling information priority time window 602 such that the amount of time dedicated to reception of the scheduling information 603 (e.g., a PDCCH message, a PDSCH message, a PUCCH message, and/or a PUSCH message, etc.) is reduced, optimized, and/or minimized, so that the UE device 130 may perform the signal quality measurements (e.g., RSRP measurements) in the remainder 604 of the signal quality measurement time window 600. Accordingly, the reception of desired, critical, and/or necessary DL and/or UL scheduling information 603 from the wireless network using the UE device's best antenna panel is prioritized over the performance of signal quality measurement, thereby improving the QoS and/or QoE performance of the UE device, while decreasing the amount of time wherein the UE device does not perform the previously scheduled signal quality measurements.

While FIGS. 4 to 6 illustrate various methods for prioritizing the reception of desired, critical, and/or necessary DL and/or UL scheduling information from the wireless network, the example embodiments are not limited thereto, and other methods may be used to prioritize the reception of DL and/or UL scheduling information from the wireless network.

Various example embodiments are directed towards a wireless network system including UE devices configured to receive DL/UL scheduling information while performing signal quality measurements. Accordingly, one or more of the example embodiments provide a method for prioritizing the reception of desired, critical, and/or necessary DL and/or UL scheduling information from the wireless network that decreases and/or reduces the probability that the UE device does not receive and/or cannot receive the desired DL and/or UL scheduling information, thereby increasing the latency, reliability, and/or QoE and/or QoE of the UE device.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
one or more antenna panels to communicate with at least one radio access network (RAN) node, the at least one RAN node including a serving RAN node;
a memory storing computer readable instructions; and
at least one processor configured to execute the computer readable instructions to cause the UE device to:
receive data reception priority configuration information from the serving RAN node, the data reception priority configuration information including designating a scheduling information priority time window, and
receive scheduling information from the serving RAN node using a first antenna panel of the one or more antenna panels during the scheduling information priority time window based on the received data reception priority configuration information and signal quality measurements corresponding to each antenna panel of the one or more antenna panels,
wherein the UE device is further caused to: collect the signal quality measurements corresponding to each antenna panel of the one or more antenna panels prior to receiving the scheduling information from the serving RAN node; and
select an antenna panel having a best signal quality measurement of the one or more antenna panels as the first antenna panel,
wherein the UE device is further caused to:
collect the signal quality measurements of each antenna panel of the one or more antenna panels by determining, for each antenna panel of the one or more antenna panels, reference signal received power measurement, received signal strength indicator measurement, reference signal received quality measurement, signal-to-noise and interference ratio measurement,
wherein the received scheduling information includes physical downlink control channel (PDCCH) information, physical downlink shared channel (PDSCH) information, physical uplink control channel (PUCCH) information, and physical uplink shared channel information (PUSCH).

2. The UE device of claim 1, wherein the UE device is further caused to:
receive signal quality measurement configuration information from the serving RAN node, the signal quality measurement configuration information designating a signal quality measurement time window;
determine whether the scheduling information priority time window conflicts with the signal quality measurement time window;
prioritize the receiving the scheduling information from the serving RAN node using the first antenna panel during the scheduling information priority time window in response to the scheduling information priority time window conflicting with the signal quality measurement time window; and
collect second signal quality measurements corresponding to each antenna panel of the one or more antenna panels during the signal quality measurement time window in response to the scheduling information priority time window not conflicting with the signal quality measurement time window.

3. The UE device of claim 1, wherein the data reception priority configuration information is received from the serving RAN node as a radio resource control (RRC) message, the data reception priority configuration information including semi-persistent scheduling configuration information.

4. The UE device of claim 1, wherein the data reception priority configuration information is received from the serving RAN node as a physical layer signaling message, the data reception priority configuration information including on-demand scheduling configuration information.

5. The UE device of claim 1, wherein the data reception priority configuration information is received from the serving RAN node as a medium access control (MAC) control element (CE) signaling message, the data reception priority configuration information including on-demand scheduling configuration information.

6. The UE device of claim 1, wherein the plurality of wireless antenna panels are located at the same or different physical locations on the body of the UE device, have the same or different orientations, operate in the same or different frequency ranges, and operate in accordance with the same or different radio access technology.

7. The UE device of claim 6, wherein the UE device also includes at least one location sensor to calculate the absolute and/or relative location of the UE device, wherein the at least one location sensor comprises a GNSS sensor, a GLONASS sensor, a Galileo sensor, or a Beidou sensor, and an inertial movement sensor comprising a gyroscope, an accelerometer, or an altimeter, wherein the location sensor uses cellular network based positioning services to determine the current location of the UE device.

8. The UE device of claim 1, wherein the UE device is further caused to:
  perform the signal quality information measurements during a desired time period and during desired time intervals;
  receive data reception priority configuration information from the serving RAN node instructing the UE device to perform the signal quality measurements according to a desired signal quality measurement configuration comprising at least one of a synchronization signal block (SSB) based radio resources management (RRM) measurement timing configuration (SMTC) pattern, enhanced SPS configuration information, and on-demand signaling.

9. A radio access network (RAN) node comprising:
  a memory storing computer readable instructions; and
  at least one processor configured to execute the computer readable instructions to cause the RAN node to:
  transmit data reception priority configuration information to at least one user equipment (UE) device, the data reception priority configuration information including designating a scheduling information priority time window, and
  transmit scheduling information to the at least one UE device, the data reception priority configuration information causing the at least one UE device to receive the scheduling information using a first antenna panel of one or more antenna panels during the scheduling information priority time window based on the data reception priority configuration information and signal quality measurements corresponding to each antenna panel of the one or more antenna panels,
  wherein the transmitted scheduling information includes physical downlink control channel (PDCCH) information, physical downlink shared channel (PDSCH) information, physical uplink control channel (PUCCH) information, and physical uplink shared channel information (PUSCH).

10. The RAN node of claim 9, wherein
  the RAN node is further caused to transmit signal quality measurement configuration information to at least one user equipment (UE) device, the signal quality measurement configuration information designating a signal quality measurement time window.

11. The RAN node of claim 9, wherein the RAN node is further caused to:
  transmit the data reception priority configuration information as a radio resource control (RRC) message, the data reception priority configuration information including semi-persistent scheduling configuration information.

12. The RAN node of claim 9, wherein the RAN node is further caused to: transmit the data reception priority configuration information as a physical-layer signaling message, the data reception priority configuration information including on-demand scheduling configuration information.

13. The RAN node of claim 9, wherein the RAN node is further caused to: transmit the data reception priority configuration information as a medium access control (MAC) control element (CE) signaling message, the data reception priority configuration information including on-demand scheduling configuration information.

14. A method of operating a user equipment (UE) device, comprising:
  receiving data reception priority configuration information from a serving RAN node, the data reception priority configuration information including designating a scheduling information priority time window; and
  receiving scheduling information from the serving RAN node using a first antenna panel of a one or more antenna panels of the UE device during the scheduling information priority time window based on the received data reception priority configuration information and signal quality measurements corresponding to each antenna panel of the one or more antenna panels,
  the method further comprising:
  collecting the signal quality measurements of each antenna panel of the one or more antenna panels, the collecting the signal quality measurements including determining, for each antenna panel of the one or more antenna panels, at least reference signal received power measurement, received signal strength indicator measurement, reference signal received quality measurement, signal-to-noise and interference ratio measurement,
  wherein the received scheduling information includes physical downlink control channel (PDCCH) information, physical downlink shared channel (PDSCH) information,
  physical uplink control channel (PUCCH) information, and physical uplink shared channel information (PUSCH).

15. The method of claim 14, further comprising:
  receiving signal quality measurement configuration information from the serving radio access network (RAN) node, the signal quality measurement configuration information designating a signal quality measurement time window; determining whether the scheduling information priority time window conflicts with the signal quality measurement time window;
  prioritizing the receiving the scheduling information from the serving RAN node using the first antenna panel during the scheduling information priority time window in response to the scheduling information priority time window conflicting with the signal quality measurement time window; and
  collecting second signal quality measurements corresponding to each antenna panel of the one or more antenna panels during the signal quality measurement time window in response to the scheduling information priority time window not conflicting with the signal quality measurement time window.

16. The method of claim 14, wherein the data reception priority configuration information is received from the serving RAN node as a radio resource control (RRC) message, the data reception priority configuration information including semi-persistent scheduling configuration information.

17. The method of claim 14, wherein the data reception priority configuration information is received from the serving RAN node as a physical-layer signaling message, the data reception priority configuration information including on-demand scheduling configuration information.

18. The method of claim 14, wherein the data reception priority configuration information is received from the serving RAN node as a medium access control (MAC) control element (CE) signaling message, the data reception priority configuration information including on-demand scheduling configuration information.

19. The method of claim 14, further comprising:
  performing the signal quality information measurements during a desired time period and during desired time intervals;

receiving data reception priority configuration information from the serving RAN node instructing the UE device to perform the signal quality measurements according to a desired signal quality measurement configuration comprising at least a synchronization signal block (SSB) based radio resources management (RRM) measurement timing configuration (SMTC) pattern, enhanced SPS configuration information, and on-demand signaling.

20. The method of claim 14, further comprising:

during the signal quality measurement window, measuring the signal quality at one or more antenna panels individually;

determining a highest quality and/or best antenna panel based on the collected signal quality measurements;

using the highest quality and/or best antenna panel for subsequent UL/DL communication with the serving cell; and determining that another panel and/or a neighboring cell offers a better quality wireless connection.

* * * * *